US012698234B2

(12) United States Patent
Kuang et al.

(10) Patent No.: US 12,698,234 B2
(45) Date of Patent: Aug. 4, 2026

(54) METHOD OF INCREASING IOX PROCESSABILITY ON GLASS ARTICLES WITH MULTIPLE THICKNESSES

(71) Applicant: CORNING INCORPORATED, Corning, NY (US)

(72) Inventors: Chai Hsin Kuang, Taipei City (TW); Sheng Min Lin, Horseheads, NY (US); I-Ting Tsai, New Taipei City (TW)

(73) Assignee: CORNING INCORPORATED, Corning, NY (US)

( * ) Notice: Subject to any disclaimer, the term of this patent is extended or adjusted under 35 U.S.C. 154(b) by 785 days.

(21) Appl. No.: 17/232,545

(22) Filed: Apr. 16, 2021

(65) Prior Publication Data

US 2021/0230057 A1     Jul. 29, 2021

Related U.S. Application Data

(62) Division of application No. 16/199,431, filed on Nov. 26, 2018, now Pat. No. 11,161,782.

(Continued)

(51) Int. Cl.
*C03C 21/00*      (2006.01)
*C03C 15/00*      (2006.01)
*C03C 19/00*      (2006.01)

(52) U.S. Cl.
CPC ............ *C03C 21/002* (2013.01); *C03C 15/00* (2013.01); *C03C 19/00* (2013.01)

(58) Field of Classification Search
None
See application file for complete search history.

(56) References Cited

U.S. PATENT DOCUMENTS 4,827,071 A      5/1989  Hazbun
4,996,031 A      2/1991  Spooner et al.
(Continued)

FOREIGN PATENT DOCUMENTS

CN      102131740 A      7/2011
CN      103476727 A      12/2013
(Continued)

OTHER PUBLICATIONS

Chinese Patent Application No. 201880077866.9, Office Action dated Mar. 9, 2022, 13 pages (8 pages of English Translation and 5 pages of Original document), Chinese Patent Office.
(Continued)

*Primary Examiner* — David Sample
(74) *Attorney, Agent, or Firm* — William Johnson; Ye Eun Park

(57) ABSTRACT

A method of producing glass-based articles having sections of different thicknesses is provided, where a maximum central tension in a thinner section is less than that of a thicker section. The method includes reducing the thickness of a region of a glass-based article that includes a compressive stress layer extending from a surface to a depth of compression to form a glass-based article with multiple thickness regions, and then ion exchanging the glass-based article to form a stress profile in the thinner region that has a maximum central tension that is less than a maximum central tension of a stress profile of the thicker region. The glass articles produced by the method are also provided.

13 Claims, 7 Drawing Sheets

Related U.S. Application Data

(60) Provisional application No. 62/592,698, filed on Nov. 30, 2017.

(56) References Cited

U.S. PATENT DOCUMENTS

| | | | |
|---|---|---|---|
| 5,221,484 | A | 6/1993 | Goldsmith et al. |
| 5,447,708 | A | 9/1995 | Helble et al. |
| 5,655,212 | A | 8/1997 | Sekhar et al. |
| 6,540,968 | B1 | 4/2003 | Huang et al. |
| 7,179,430 | B1 | 2/2007 | Stobbe et al. |
| 7,250,385 | B1 | 7/2007 | Ohno et al. |
| 7,740,817 | B2 | 6/2010 | Matsumoto et al. |
| 8,312,739 | B2 | 11/2012 | Lee et al. |
| 8,545,939 | B2 | 10/2013 | Donet et al. |
| 8,561,429 | B2 | 10/2013 | Allan et al. |
| 2004/0137209 | A1 | 7/2004 | Zeller et al. |
| 2008/0017034 | A1 | 1/2008 | Becue et al. |
| 2011/0100910 | A1 | 5/2011 | Johansen et al. |
| 2012/0052271 | A1 | 3/2012 | Gomez et al. |
| 2012/0236526 | A1 | 9/2012 | Weber |
| 2014/0050912 | A1 | 2/2014 | Sono et al. |
| 2014/0132856 | A1 | 5/2014 | Hung et al. |
| 2014/0141217 | A1 | 5/2014 | Gulati et al. |
| 2014/0245724 | A1 | 9/2014 | Tanaka et al. |
| 2015/0008178 | A1 | 1/2015 | Miyahara et al. |
| 2015/0157962 | A1 | 6/2015 | Bookbinder et al. |
| 2016/0001229 | A1 | 1/2016 | Ancimer et al. |
| 2016/0102014 | A1* | 4/2016 | Hu .......... C03C 10/00 |
| | | | 501/67 |
| 2016/0326050 | A1 | 11/2016 | Lee et al. |
| 2016/0376187 | A1* | 12/2016 | Gross .......... C03C 21/002 |
| | | | 361/679.01 |
| 2017/0022092 | A1 | 1/2017 | Demartino et al. |
| 2017/0291849 | A1 | 10/2017 | Dejneka et al. |
| 2017/0295657 | A1 | 10/2017 | Gross et al. |
| 2020/0199020 | A1* | 6/2020 | Hatano .......... G06F 1/1626 |

FOREIGN PATENT DOCUMENTS

| | | | | |
|---|---|---|---|---|
| CN | 105593185 | A | | 5/2016 |
| CN | 106604903 | A | | 4/2017 |
| EP | 0685258 | A1 | | 12/1995 |
| JP | 2006-346597 | A | | 12/2006 |
| JP | 2007-167848 | A | | 7/2007 |
| JP | 2017001902 | A | * | 1/2017 |
| WO | 2006/034717 | A1 | | 4/2006 |
| WO | 2008/106028 | A1 | | 9/2008 |
| WO | 2012/125857 | A1 | | 9/2012 |
| WO | WO-2018116981 | A1 | * | 6/2018 .......... C03C 15/00 |

OTHER PUBLICATIONS

International Search Report and Written Opinion PCT/US2018/063113 Dated Feb. 28, 2019, 10 pgs.

Chinese Patent Application No. 202110535187.5, Office Action, dated Aug. 3, 2022, 15 pages, (8 pages of English Translation and 7 pages of Original Copy); Chinese Patent Office.

* cited by examiner

| | |
|---|---|
| Form Compressive Stress Layer | 410 |
| Reduce Thickness | 420 |
| Ion Exchange | 430 |

200

202

212

210

202

220

222

202

300

302

312

312

310

302

322

320

302

METHOD OF INCREASING IOX PROCESSABILITY ON GLASS ARTICLES WITH MULTIPLE THICKNESSES

RELATED APPLICATIONS

This application is a divisional application and claims the benefit of priority under 35 U.S.C. § 120 of U.S. application Ser. No. 16/199,431 filed on Nov. 26, 2018, which in turn, claims the benefit of priority of U.S. Provisional Application Ser. No. 62/592,698 filed on Nov. 30, 2017, the contents of which are relied upon and incorporated herein by reference in their entirety.

FIELD

Embodiments of the disclosure generally relate to ion exchanged glass-based articles having sections of different thicknesses and methods for manufacturing the same.

BACKGROUND

Glass-based articles are used in various industries including consumer electronics, transportation, architecture, defense, medical, and packaging. For consumer electronics, glass-based articles are used in electronic devices as cover plates or windows for portable or mobile electronic communication and entertainment devices, such as mobile phones, smart phones, tablets, video players, information terminal (IT) devices, laptop computers, navigation systems and the like. In architecture, glass-based articles are included in windows, shower panels, and countertops; and in transportation, glass-based articles are present in automobiles, trains, aircraft, and sea-craft. Glass-based articles are suitable for any application that requires superior fracture resistance but thin and light-weight articles. For each industry, mechanical and/or chemical reliability of the glass-based articles is typically driven by functionality, performance, and cost. Improving the mechanical and/or chemical reliability of these articles is an ongoing goal.

Chemical treatment is a strengthening method to impart a desired/engineered stress profile having one or more of the following parameters: compressive stress (CS), depth of compression (DOC), and maximum central tension (CT). Many glass-based articles, including those with engineered stress profiles, have a compressive stress that is highest or at a peak at the glass surface and reduces from a peak value moving away from the surface, and there is zero stress at some interior location of the glass article before the stress in the glass article becomes tensile. Chemical strengthening by ion exchange (IOX) of alkali-containing glass is a proven methodology in this field.

In the consumer electronics industry, chemically-strengthened glass is used as a preferred material for display covers due to better aesthetics and scratch resistance compared to plastics, and better drop performance plus better scratch resistance compared to non-strengthened glass. In the past, thickness of cover glass has been mostly uniform. But recently, there has been interest in cover glass designs of non-uniform thicknesses.

There is a need for chemically-strengthened glass articles having non-uniform thicknesses.

SUMMARY

Aspects of the disclosure pertain to glass-based articles having sections of different thicknesses and methods for their manufacture.

According to aspect (1), a method of producing a glass-based article is provided. The method comprises: reducing the thickness of a portion of a glass-based article containing a compressive stress layer extending from a surface to a depth of compression and a having a first thickness $t_1$ to form a glass-based article containing a region with a second thickness $t_2$; and exposing the glass-based article containing the region with a second thickness $t_2$ to a bath comprising alkali metal ions to ion-exchange the glass-based article containing the region with the second thickness $t_2$ to form a first stress profile of a region having the first thickness $t_1$ comprising a first central tension region comprising a first maximum central tension ($CT_1$) and a second stress profile of the region with the second thickness $t_2$ comprising a second central tension region comprising a second maximum central tension ($CT_2$). The $CT_2$ is less than $CT_1$, and $t_2$ is less than $t_1$.

According to aspect (2), the method of aspect (1) is provided, further comprising exposing a glass-based substrate to a bath comprising alkali metal ions to ion-exchange the glass-based substrate and form the glass-based article comprising the compressive stress layer extending from the surface to the depth of compression.

According to aspect (3), the method of aspect (2) is provided, wherein the glass-based substrate is exposed to a first bath comprising alkali metal ions for a first duration, and subsequently to a second bath comprising alkali metal ions for a second duration.

According to aspect (4), the method of aspect (2) or (3) is provided, wherein the glass-based substrate is a lithium-containing aluminosilicate and the bath comprises ions of potassium and sodium.

According to aspect (5), the method of any of aspects (1) to (4) is provided, wherein the glass-based article comprising the compressive stress layer extending from the surface to the depth of compression is a laminate that includes layers with different coefficients of thermal expansion, and the glass-based article has been thermally treated to produce the compressive stress layer.

According to aspect (6), the method of any of aspects (1) to (5) is provided, wherein reducing the thickness comprises at least one of machining and polishing.

According to aspect (7), the method of any of aspects (1) to (6) is provided, wherein reducing the thickness comprises acid etching.

According to aspect (8), the method of any of aspects (1) to (7) is provided, wherein the region having the first thickness $t_1$ comprises a first compressive stress ($CS_1$) and the region with the second thickness $t_2$ comprises a second compressive stress ($CS_2$), wherein $CS_2$ is less than $CS_1$.

According to aspect (9), the method of any of aspects (1) to (8) is provided, wherein the region having the first thickness $t_1$ comprises a first depth of compression ($DOC_1$) and the region with the second thickness $t_2$ comprises a second depth of compression ($DOC_2$), wherein $DOC_2$ is less than $DOC_1$.

According to aspect (10), the method of any of aspects (1) to (9) is provided, wherein the glass-based article comprises a soda-lime silicate, an alkali-aluminosilicate, an alkali-containing borosilicate, an alkali-containing aluminoborosilicate, or an alkali-containing phosphosilicate.

According to aspect (11), the method of any of aspects (1) to (10) is provided, wherein the glass-based article comprises a lithium-containing aluminosilicate.

According to aspect (12), the method of any of aspects (1) to (11) is provided, wherein the region with the second thickness $t_2$ is off-set from all edges of the glass-based article.

According to aspect (13), the method of any of aspects (1) to (12) is provided, wherein $t_2$ is at least 100 microns less than $t_1$.

According to aspect (14), the method of any of aspects (1) to (13) is provided, further comprising one or more metals selected from the group consisting of: silver, copper, zinc, titanium, rubidium, and cesium.

According to aspect (15), a glass-based article produced by the method of any of aspects (1) to (14) is provided.

According to aspect (16), a consumer electronic product is provided. The consumer electronic product comprises: a housing having a front surface, a back surface, and side surfaces; electrical components provided at least partially within the housing, the electrical components including at least a controller, a memory, and a display, the display being provided at or adjacent the front surface of the housing; and a cover plate disposed over the display. A portion of at least one of the housing and the cover plate comprises the glass-based article of aspect (15).

BRIEF DESCRIPTION OF THE DRAWINGS

The accompanying figures, which are incorporated in and constitute a part of this specification, illustrate several embodiments described below.

DETAILED DESCRIPTION

Figure 1:
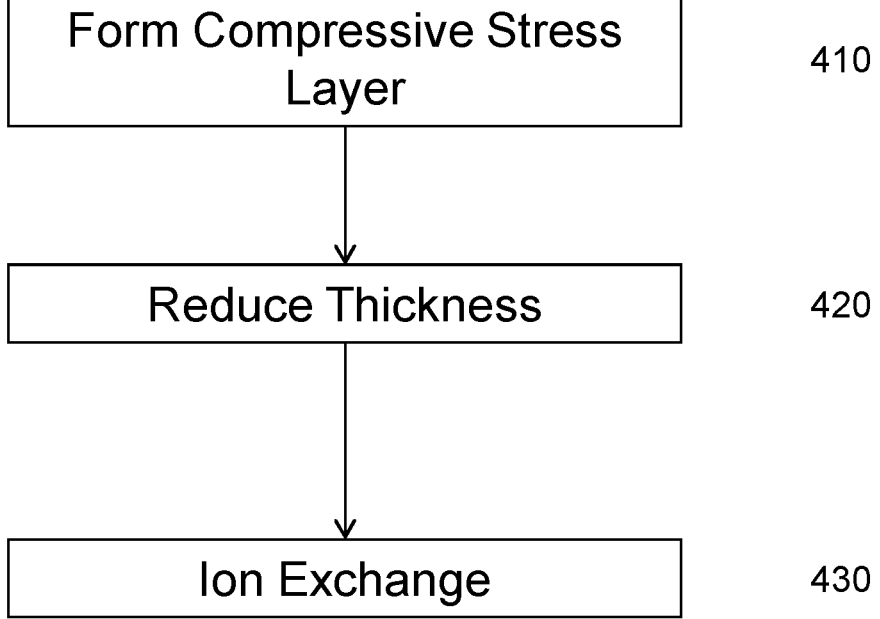
FIG. 1 is a flow chart illustrating a method of producing a glass-based article with multiple thicknesses according to embodiments.

Before describing several exemplary embodiments, it is to be understood that the disclosure is not limited to the details of construction or process steps set forth in the following disclosure. The disclosure provided herein is capable of other embodiments and of being practiced or being carried out in various ways.

Reference throughout this specification to "one embodiment," "certain embodiments," "various embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in various embodiments," "in one embodiment" or "in an embodiment" in various places throughout this specification are not necessarily referring to the same embodiment. Furthermore, the particular features, structures, materials, or characteristics may be combined in any suitable manner in one or more embodiments.

The term "glass-based" is used to include any object made wholly or partly of glass, including glass-ceramics (including an amorphous phase and a crystalline phase) and laminates of glass and non-glass materials, such as laminates of glass and crystalline materials. Glass-based substrates according to one or more embodiments may be selected from soda-lime silicate glass, alkali-alumino silicate glass, alkali-containing borosilicate glass, alkali-containing aluminoborosilicate glass, and alkali-containing phosphosilicate.

A "base composition" is a chemical make-up of a substrate prior to any ion exchange (IOX) treatment. That is, the base composition is undoped by any ions from IOX. As utilized herein, a "glass-based substrate" refers to a precursor prior to strengthening treatment for the formation of a compressive stress layer. Similarly, a "glass-based article" refers to the post ion exchange article that includes a compressive stress layer.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, for example, a glass-based article that is "substantially free of MgO" is one in which MgO is not actively added or batched into the glass-based article, but may be present in very small amounts as a contaminant, such as amounts less than 0.01 mol %. As utilized herein, when the term "about" is used to modify a value, the exact value is also disclosed.

A "stress profile" refers to stress with respect to position within a glass-based article or any portion thereof. A compressive stress region extends from a first surface to a depth of compression (DOC) of the article, where the article is under compressive stress. A central tension region extends from the DOC to include the region where the article is under tensile stress.

As used herein, depth of compression (DOC) refers to the depth at which the stress within the glass-based article changes from compressive to tensile stress. At the DOC, the stress crosses from a positive (compressive) stress to a negative (tensile) stress and thus exhibits a stress value of zero. According to the convention normally used in mechanical arts, compression is expressed as a negative (<0) stress and tension is expressed as a positive (>0) stress. Throughout this description, however, compressive stress (CS) is expressed as a positive or absolute value—i.e., as recited herein, CS=|CS|. In addition, tensile stress is expressed herein as a negative (<0) stress or, in some situations where the tensile stress is specifically identified, as an absolute value. Central tension (CT) refers to tensile stress in a central region or central tension region of the glass-based article. Maximum central tension (maximum CT or $CT_{max}$) occurs in the central tension region, and often is located at 0.5·t, where t is the article thickness for articles where the compressive stress layers are symmetrical.

A non-zero alkali metal oxide concentration that varies along at least a substantial portion of the article thickness (t), the first section thickness ($t_1$), or the second section thickness ($t_2$) indicates that a stress has been generated in the article, first section, or second section, respectively, as a result of ion exchange. The variation in metal oxide concentration may be referred to herein as a metal oxide concentration gradient. The metal oxide that is non-zero in concentration and varies along a portion of the thickness may be described as generating a stress in the glass-based article. The concentration gradient or variation of one or more metal oxides is created by chemically strengthening a glass-based substrate in which a plurality of first metal ions in the glass-based substrate are exchanged with a plurality of second metal ions.

Unless otherwise specified, CT and CS are expressed herein in megaPascals (MPa), whereas thickness and DOC are expressed in millimeters or microns (micrometers).

CS and DOC are measured using those means known in the art, such as by scattering polarimetry using a SCALP-5 measurement system from Glasstress (Estonia). Other possible techniques for measuring CS and DOC include a surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to those methods known in the art, such a Procedure C (Glass Disc Method) described in ASTM standard C770-16, entitled "Standard Test Method for Measurement of Glass Stress-Optical Coefficient," the contents of which are incorporated herein by reference in their entirety.

State-of-the-art ion exchange (IOX) of alkali-containing glass has focused on glass-based articles of uniform thickness. Glass-based articles, however, are now being designed with non-uniform thicknesses, both at the edges and in areas away from the edges. One exemplary application is to form a recess in a glass-based cover to house a fingerprint sensor to replace a traditional through-hole or through-slot for receipt of the fingerprint sensor. By housing the fingerprint sensor in strengthened glass, traditional polymeric fingerprint sensor covers are eliminated, allowing for improved scratch resistance and better user experience because there are no protruding or slotted features on the cover glass. When substrates with non-uniform thicknesses are chemically strengthened under state-of-the art IOX methods, thinner sections can have higher central tension (CT) than the thicker sections. This is a result of the force balance necessary to counteract the compressive stress in the article. When a thick region and a thin region have the same compressive stress layers, the thin region necessarily has a higher CT, as the total tension required to counter balance the compressive stress is confined to a smaller area. The higher CT in the thinner sections can be detrimental to the reliability of the final glass-based article and, in many cases, can make it frangible, which is undesirable. As the difference in thicknesses between the various regions of the glass-based articles increases, the higher CT of the thinner sections prevents the thicker regions from having the desired compressive stress and depth of compression while also maintaining the non-frangibility of the thinner sections. For this reason, a method of producing glass-based articles with multiple thicknesses where thicker regions have the desired compressive stress and depth of compression characteristics and thinner sections are non-frangible, as indicated by a lower maximum CT in the thinner sections, is desirable.

The methods disclosed herein produce glass-based articles that are advantageous in that they have sections of different thicknesses with the thicker sections having high compressive stress and deep depth of compression while the thin sections have a low enough maximum central tension to avoid undesirable fracture characteristics, such as frangibility. In some embodiments, the glass-based articles include a stress profile that includes a first central tension in a first section having a first thickness and a second central tension in a second section having a second thickness, wherein the second thickness is less than the first thickness, and the second central tension is less than the first central tension. The glass-based articles are formed from substrates having one or more alkali metals in a base composition, the substrates being exposed to ion exchange such that the articles comprise one or more ion-exchanged metals. The one or more ion-exchanged metals may comprise one or more of: lithium, potassium, and sodium. Further ion-exchanged metals may comprise one or more metals selected from the group including silver, copper, zinc, titanium, rubidium, and cesium.

Glass-based substrates may be strengthened by single-, dual-, or multi-step ion exchange (IOX). Non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," in which glass is strengthened by ion exchange in a first bath diluted with an effluent ion, followed by immersion in a second bath having a smaller concentration of the effluent ion than the first bath. The contents of U.S. Pat. Nos. 8,561,429 and 8,312,739 are incorporated herein by reference in their entireties.

Glass-based substrates may also be strengthened by thermal tempering. In some embodiments, glass-based substrates may be laminates of multiple layers with different coefficients of thermal expansion, such that upon thermal treatment a glass-based article is formed with a compressive layer extending from a surface to a depth of compression.

In the glass-based articles, there is an alkali metal oxide having a non-zero concentration that varies independently in both the first section along at least a portion of the $t_1$ and the second section along at least a portion of the $t_2$. The stress profiles in each section are generated due to the non-zero concentration of the metal oxide(s) that varies along a portion of each thickness. In some embodiments, the concentration of a metal oxide is non-zero and varies, both along a thickness range from $0 \cdot (t_1$ or $t_2)$ to about $0.3 \cdot (t_1$ or $t_2)$. In some embodiments, the concentration of the metal oxide is non-zero and varies along a thickness range from $0 \cdot (t_1$ or $t_2)$ to about $0.35 \cdot (t_1$ or $t_2)$, from $0 \cdot (t_1$ or $t_2)$ to about $0.4 \cdot (t_1$ or $t_2)$, from $0 \cdot (t_1$ or $t_2)$ to about $0.45 \cdot (t_1$ or $t_2)$, from $0 \cdot (t_1$ or $t_2)$ to about $0.48 \cdot (t_1$ or $t_2)$, or from $0 \cdot (t_1$ or $t_2)$ to about $0.50 \cdot (t_1$ or $t_2)$. The variation in concentration may be continuous along the above-referenced thickness ranges. Variation in concentration may include a change in metal oxide concentration of about at least about 0.2 mol % along a thickness segment of about 100 micrometers. The change in metal oxide concentration may be at least about 0.3 mol %, at least about 0.4 mol %, or at least about 0.5 mol % along a thickness segment of about 100 micrometers. This change may be measured by known methods in the art including microprobe.

In some embodiments, the variation in concentration may be continuous along thickness segments in the range from about 10 micrometers to about 30 micrometers. In some embodiments, the concentration of the metal oxide decreases from the first surface of the first or second section to a point between the first surface and the second surface and increases from the point to the second surface.

The concentration of metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while at deeper depths, the concentration of ions having a smaller radius is greater than the concentration of ions having a larger radius. For example, where a single Na- and K-containing bath is used in the ion exchange process, the concentration of K+ ions in the glass-based article is greater than the concentration of Na+ ions at shallower depths, while the concentration of Na+ is greater than the concentration of K+ ions at deeper depths. This is due, in part, to the size of the monovalent ions that are exchanged into the glass for smaller monovalent ions. In such glass-based articles, the area at or near the surface comprises a greater CS due to the greater amount of larger ions (i.e., K+ ions) at or near the surface. Furthermore, the slope of the stress profile typically decreases with distance from the surface due to the nature of the concentration profile achieved due to chemical diffusion from a fixed surface concentration.

In one or more embodiments, the varying metal oxide concentration gradient extends through a substantial portion of the thicknesses $t_1$ or $t_2$ or the entire thicknesses $t_1$ or $t_2$ of the sections. In some embodiments, the concentration of the metal oxide may be about 0.5 mol % or greater (e.g., about 1 mol % or greater) along the entire thickness of the first and/or second section, and is greatest at a first surface and/or a second surface $0 \cdot (t_1$ or $t_2)$ and decreases substantially constantly to a point between the first and second surfaces. At that point, the concentration of the metal oxide is the least along the entire thickness $t_1$ or $t_2$; however the concentration is also non-zero at that point. In other words, the non-zero concentration of that particular metal oxide extends along a substantial portion of the thickness $t_1$ or $t_2$ (as described herein) or the entire thickness $t_1$ or $t_2$. The total concentration of the particular metal oxide in the glass-based article may be in the range from about 1 mol % to about 20 mol %.

The concentration of the metal oxide may be determined from a baseline amount of the metal oxide in the glass-based substrate ion exchanged to form the glass-based article. The concentration of the metal oxide in the glass-based substrate may be in the range from about 1 mol % to about 20 mol %.

The glass-based articles disclosed herein are produced by reducing the thickness of a portion of the glass-based article after a compressive stress layer extending from a surface to a depth of compression has been formed. The reduction in thickness also removes the compressive stress layer, thereby reducing the total compressive stress that must be balanced by the central tension. This reduction in overall stress in the thinner regions reduces the central tension in the reduced thickness regions. The glass articles are then able to be ion exchanged without raising the central tension of the reduced thickness regions to the point that produces undesirable fracture behavior, such as frangibility.

Turning to the figures, FIG. 1 illustrates an exemplary method of producing a glass-based article with multiple thicknesses according to an embodiment. As shown in FIG. 1, the method includes reducing the thickness 420 of a portion of a glass-based article having a compressive stress layer to produce a glass based article having a reduced thickness region. The glass-based article having a reduced thickness region is then subjected to ion exchange 430, such that the compressive stress and depth of compression of the glass-based article is increased in both the reduced thickness region and the regions where the thickness was not reduced. In this manner the compressive stress and depth of compression of the non-reduced thickness sections may be increased to a level that would render the reduced thickness section frangible if completed in a single ion exchange step. The method may optionally include forming the compressive stress layer 410 in the glass-based article prior to the reduction of thickness step.

The reduction in thickness may be performed by any appropriate method. In some embodiments, the thickness is reduced by mechanical processes, such as polishing or grinding. In some other embodiments, the thickness is reduced by chemical processes, such as acid etching. In yet other embodiments, a combination of mechanical and chemical processes may be utilized to reduce the thickness of a region of the glass-based article.

Figure 2A:
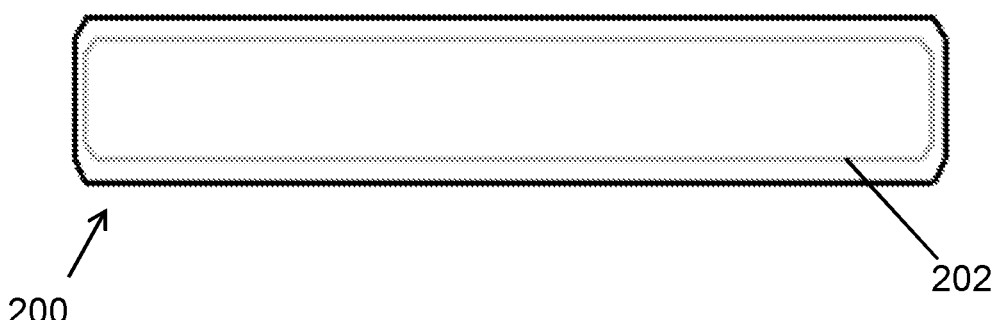
FIG. 2A is a cross-sectional representation of a glass-based article having a compressive stress layer extending from a surface to a depth of compression.
Figure 2B:
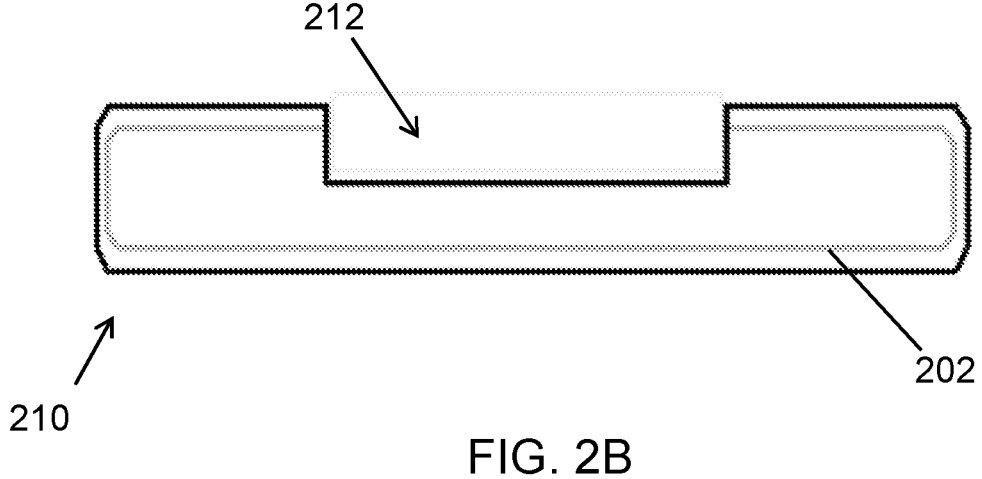
FIG. 2B is a cross-sectional representation of a glass-based article formed by reducing the thickness of a portion of the glass-based article of FIG. 2A.
Figure 2C:
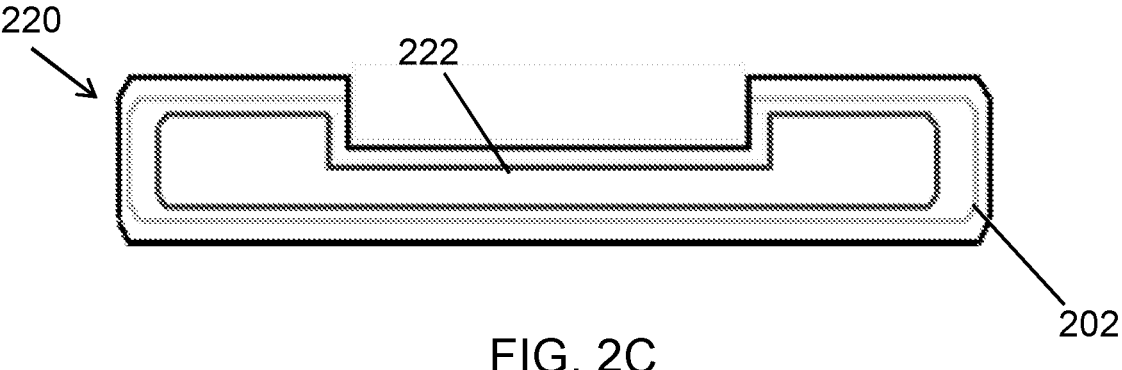
FIG. 2C is a cross-sectional representation of a glass-based article formed by ion exchanging the glass-based article of FIG. 2B.

FIG. 2A illustrates a cross-section of a glass-based article 200 having a compressive stress layer extending from the surface to a depth of compression 202 prior to a reduction in thickness. The glass-based article 200 is processed to reduce the thickness of a central region away from the edges, producing a glass-based article 210 having a reduced thickness region 212, as shown in FIG. 2B. The reduction in thickness also removes the compressive stress layer from the reduced thickness region 212. The glass-based article 210 is then subjected to an ion exchange treatment to provide a glass-based article 220 with a compressive stress layer having a depth of compression 222 that is present around the entire circumference of the glass-based article, including the reduced thickness region. As illustrated in FIG. 2C, the depth of compression 222 is reduced in the reduced thickness region when compared to the non-reduced thickness region, due to the removal of the original compressive stress layer in the reduced thickness region 212 prior to the ion exchange. The depth of compression 202 that was present before the processing of the glass based article 200 is shown in FIG. 2C for comparison purposes.

Figure 3A:
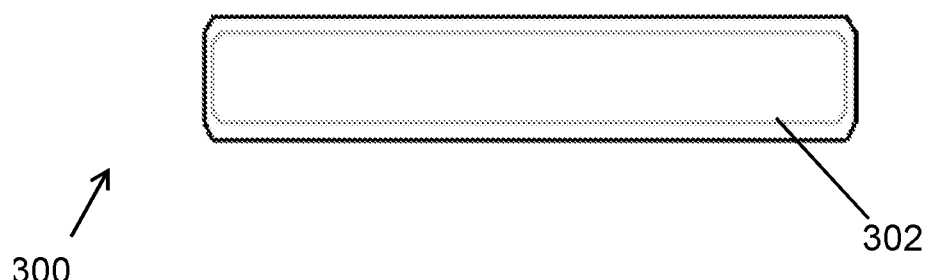
FIG. 3A is a cross-sectional representation of a glass-based article having a compressive stress layer extending from a surface to a depth of compression.
Figure 3B:
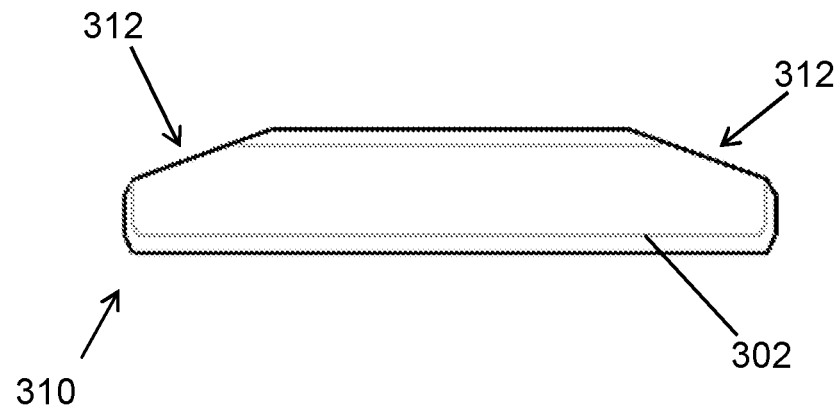
FIG. 3B is a cross-sectional representation of a glass-based article formed by reducing the thickness of edge portions of the glass-based article of FIG. 3A.
Figure 3C:
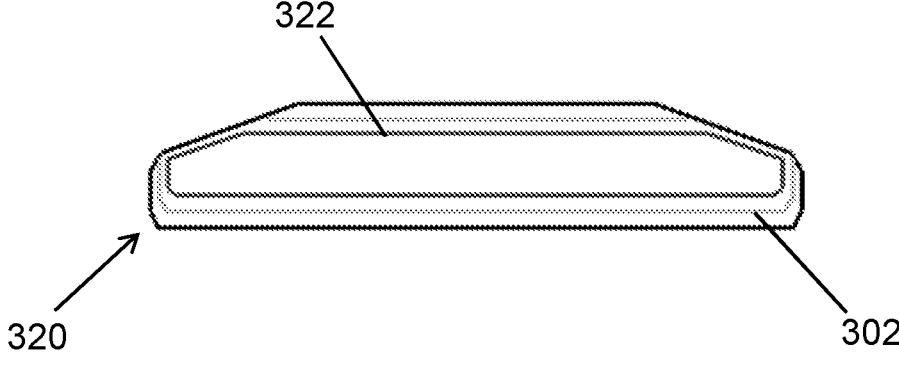
FIG. 3C is a cross-sectional representation of a glass-based article formed by ion exchanging the glass-based article of FIG. 3B.

FIG. 3A illustrates a cross-section of a glass-based article 300 having a compressive stress layer extending from the surface to a depth of compression 302 prior to a reduction in thickness. The glass-based article 300 is processed to reduce the thickness of edge regions, producing a glass-based article 310 having reduced thickness regions 312, as shown in FIG. 3B. The reduction in thickness also removes the compressive stress layer from the reduced thickness regions 312. The glass-based article 310 is then subjected to an ion exchange treatment to provide a glass-based article 320 with a compressive stress layer having a depth of compression 322 that is present around the entire circumference of the glass-based article, including the reduced thickness region. As illustrated in FIG. 3C, the depth of compression 322 is reduced in the reduced thickness regions 312 when compared to the non-reduced thickness region, due to the removal of the original compressive stress layer in the reduced thickness region prior to the ion exchange. The depth of compression 302 that was present before the processing of the glass based article 300 is shown in FIG. 3C for comparison purposes.

Figure 4:
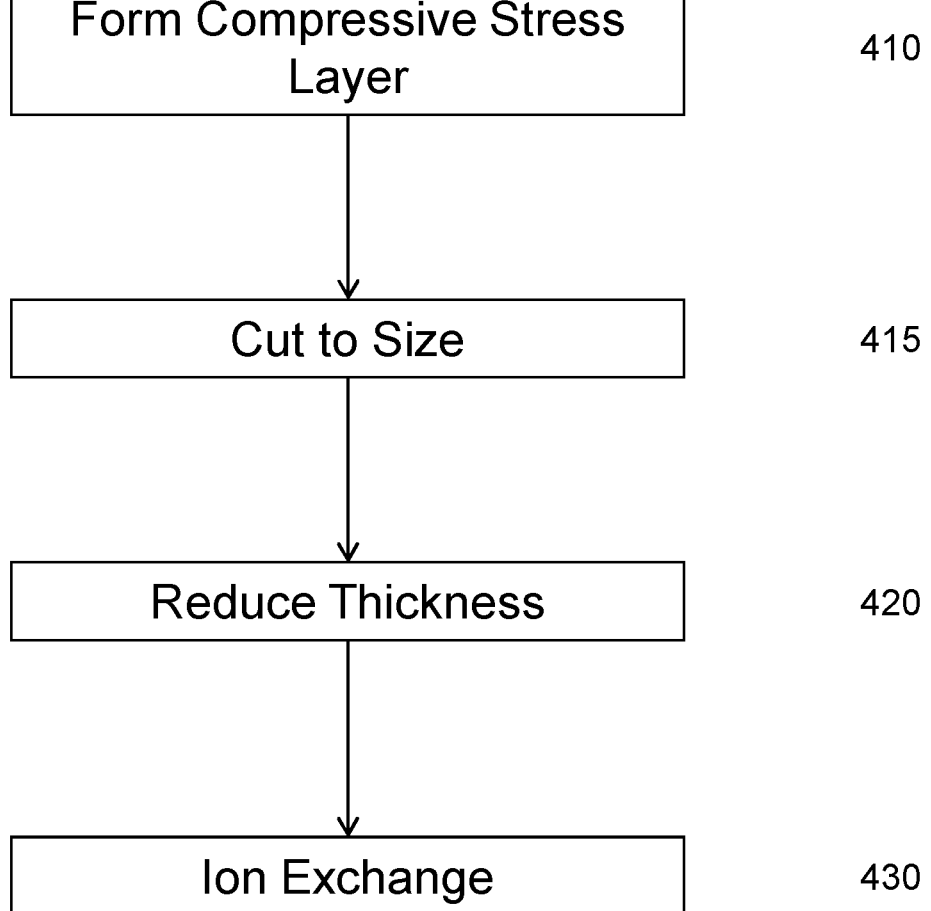
FIG. 4 is a flow chart illustrating a method of producing a glass-based article with multiple thicknesses according to embodiments.

FIG. 4 illustrates an exemplary method of producing a glass-based article with multiple thicknesses according to an embodiment. As shown in FIG. 4, the method includes reducing the thickness 420 of a portion of a glass-based article having a compressive stress layer to produce a glass based article having a reduced thickness region. The glass-based article having a reduced thickness region is then subjected to ion exchange 430, such that the compressive stress and depth of compression of the glass-based article is increased in both the reduced thickness region and the regions where the thickness was not reduced. In this manner the compressive stress and depth of compression of the non-reduced thickness sections may be increased to a level that would render the reduced thickness section frangible if completed in a single ion exchange step. The method may optionally include forming compressive stress layer 410 in the glass-based article prior to the reduction of thickness step. Prior to reducing the thickness 420 of a portion of the glass-based article, the glass-based article may be cut to size 415. For example, a large sheet of glass having a compressive layer may be cut to a desired part size prior to reducing the thickness 420 of the glass-based article.

The method may also include forming the glass-based article into a 3D or 2.5D shape. As utilized herein, a "2.5D shape" refers to a sheet shaped article with at least one major surface being at least partially nonplanar, and a second major surface being substantially planar. As utilized herein, a "3D shape" refers to an article with first and second opposing major surfaces that are at least partially nonplanar. This forming may be carried out at any time in the process. In some embodiments, this additional forming may be carried out prior to reducing the thickness of a portion of the glass-based article. In other embodiments, this forming may be carried out after the reduction in thickness, such as before or after the ion exchange of the glass-based article.

In some embodiments, the compressive stress layer of the glass-based article subjected to the reduction in thickness processing may be formed by any appropriate method. In some embodiments, the compressive stress layer may be formed by an ion exchange treatment. In other embodiments, the compressive stress layer may be formed by thermal tempering.

The method of producing a glass-based article with a reduced thickness region may include additional ion exchange treatments. The utilization of multiple ion exchange treatments may allow the formation of stress profiles with unique stress profiles that are not achievable in a single ion exchange treatment. The method may also include multiple processing steps in which a portion of the glass-based article is reduced in thickness. These additional reductions in thickness may or may not be separated by ion exchange treatments. The utilization of multiple thickness reduction steps may allow the production of glass-based articles with a plurality of different thickness regions.

Figures 5, 6, 7:
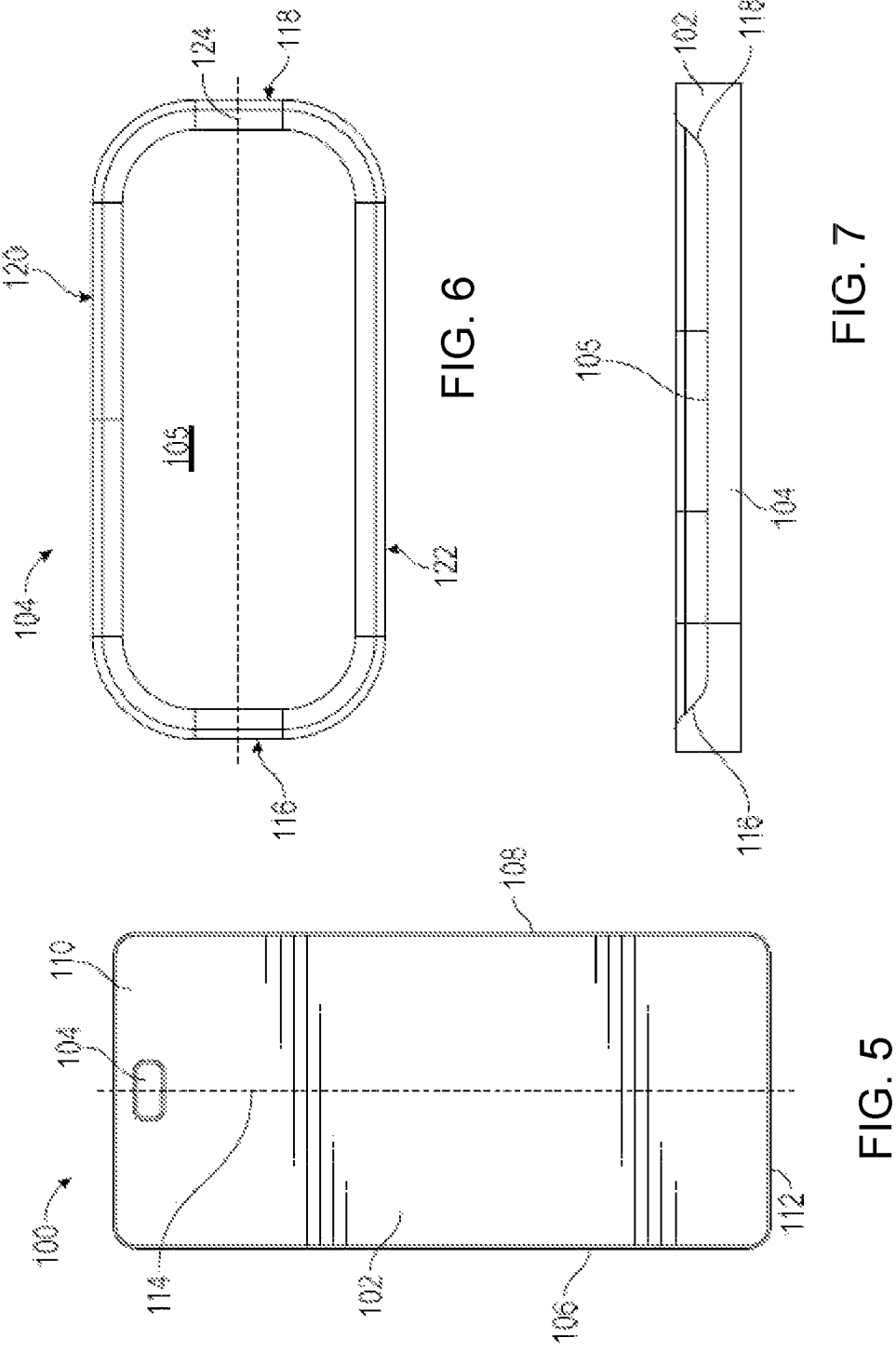
FIG. 5 illustrates an exemplary glass-based article.
FIG. 6 illustrates a pocket of an exemplary glass-based article.
FIG. 7 illustrates a cross-section of the pocket of FIG. 7.

FIG. 5 illustrates a glass-based article 100 having a non-uniform thickness away from edges in an embodiment. First section 102 has a first thickness ($t_1$) and a first maximum central tension ($CT_1$). Line 114 designates a midline of the article 100. Second section 104 has a second thickness ($t_2$) and a second maximum central tension ($CT_2$). Generally, the difference between $t_1$ and $t_2$ is at least 100 microns. In one or more embodiments, the $t_1$ is greater than the $t_2$ by at least 100 microns. The $t_2$ may be in the range of $0.05 \cdot t_1$ to $0.96 \cdot t_1$. In one or more embodiments, the $t_2$ is reduced by greater than or equal to about 20% relative to $t_1$, or by greater than or equal to about 30%, greater than or equal to about 40%, greater than or equal to about 50%, greater than or equal to about 60%, greater than or equal to about 70%, greater than or equal to about 80%, greater than or equal to about 90%, greater than or equal to about 95%, and all values and subranges therebetween. The $t_1$ may be in the range of 0.3 mm to 2.5 mm, and all values and subranges therebetween; and the $t_2$ may be in the range of 0.025 mm to 2.4 mm, and all values and subranges therebetween. $CT_2$ is less than the $CT_1$, which is advantageous for ensuring the second section is not frangible despite having been ion exchanged under the same conditions as the first section. While the figures depict a single section having a thickness different from the rest of the article, it is noted that there may be multiple sections or pockets of different depths in the same article.

In this embodiment, the second section 104 is off-set from all edges 106, 108, 110, and 112 of the article 100. That is, second section 104 does not intersect any of the edges 106, 108, 110, 112.

FIG. 6 illustrates the second section 104 being defined by sides 116, 118, 120, and 122. In this embodiment, the second section 104 is a thin pocket designed to accommodate a fingerprint sensor or the like. Line 124 designates a centerline of the second section 104. FIG. 7 illustrates a cross-section of the article 100 along line 124 of FIG. 6. Sides 116, 118, 120, and 122 provide a transition from a body 105 of the second section 104 to the first section 102. In some embodiments, the article has a size of 141.4 millimeters by 68.4 millimeters and the first section is 0.6 millimeters thick. In some embodiments, the pocket has a size of 5.6 millimeters by 12.3 millimeters and the second section is 0.3 millimeters thick.

Figures 8A, 8B:
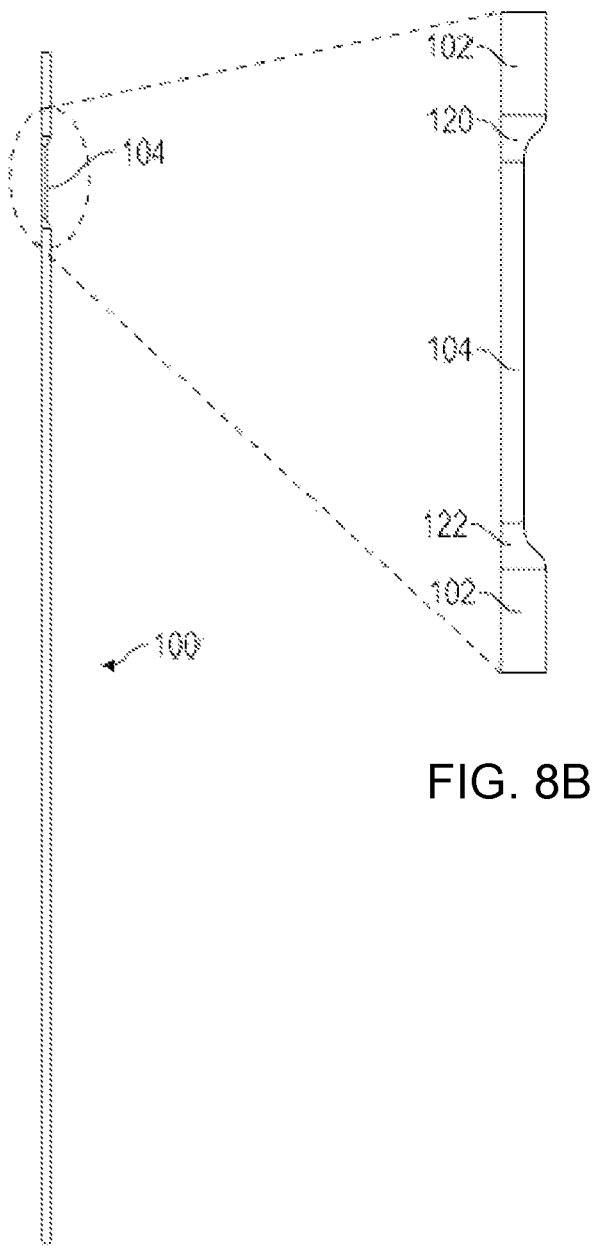
FIG. 8A illustrates a cross-section of the article of FIG. 5.
FIG. 8B illustrates a close-up cross-section of a portion of the article of FIG. 5 with a different thickness.

FIG. 8A illustrates a cross-section of the article 100 along midline 114 of FIG. 5 and the location of second section 104. FIG. 8B illustrates a close-up of the cross-section of the second section 104 having sides 120 and 122 which transition to the first section 102.

Glass-based substrates may be provided using a variety of different processes. For example, exemplary glass-based substrate forming methods include float glass processes and down-draw processes such as fusion draw and slot draw. A glass-based substrate may be prepared by floating molten glass on a bed of molten metal, typically tin, to produce a float glass characterized by smooth surfaces and uniform thickness. In an example process, molten glass that is fed onto the surface of the molten tin bed forms a floating glass ribbon. As the glass ribbon flows along the tin bath, the temperature is gradually decreased until the glass ribbon solidifies into a solid glass-based substrate that can be lifted from the tin onto rollers. Once off the bath, the glass-based substrate can be cooled further, annealed to reduce internal stress, and optionally polished.

Down-draw processes produce glass-based substrates having a uniform thickness that possess relatively pristine surfaces. Because the average flexural strength of the glass-based substrate is controlled by the amount and size of surface flaws, a pristine surface has a higher initial strength. When this high strength glass-based substrate is then further strengthened (e.g., chemically), the resultant strength can be higher than that of a glass-based substrate with a surface that has been lapped and polished. Down-drawn glass-based substrates may be drawn to a thickness of less than about 2 mm. In addition, down drawn glass-based substrates have a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based substrate. The fusion draw method offers the advantage that, because the two glass films flowing over the channel fuse together, neither of the outside surfaces of the resulting glass-based substrate comes in contact with any part of the apparatus. Thus, the surface properties of the fusion drawn glass-based substrate are not affected by such contact.

The slot draw process is distinct from the fusion draw method. In slot draw processes, the molten raw material glass is provided to a drawing tank. The bottom of the drawing tank has an open slot with a nozzle that extends the length of the slot. The molten glass flows through the slot/nozzle and is drawn downward as a continuous substrate and into an annealing region.

Exemplary base compositions of glass-based substrates may comprise but are not limited to: a soda-lime silicate, an alkali-alumino silicate, an alkali-containing borosilicate, an alkali-containing aluminoborosilicate, or an alkali-containing phosphosilicate. Glass-based substrates may include a lithium-containing aluminosilicate.

Examples of glasses that may be used as substrates may include alkali-alumino silicate glass compositions or alkali-containing aluminoborosilicate glass compositions, though other glass compositions are contemplated. Such glass compositions may be characterized as ion exchangeable. As used herein, "ion exchangeable" means that a substrate comprising the composition is capable of exchanging cations located at or near the surface of the substrate with cations of the same valence that are either larger or smaller in size.

In an embodiment, the base glass composition comprises a soda lime silicate glass. In and embodiment, the soda lime silicate glass composition is, on an oxide basis: 73.5 wt. % $SiO_2$, 1.7 wt. % $Al_2O_3$, 12.28 wt.-% $Na_2O$, 0.24 wt. % $K_2O$, 4.5 wt. % MgO, 7.45 wt. % CaO, 0.017 wt. % $ZrO_2$, 0.032 wt. % $TiO_2$, 0.002 wt. % $SnO_2$, 0.014 wt. % SrO, 0.093 wt. % $Fe_2O_3$, 0.001 wt. % $HfO_2$, 0.028 wt. % Cl oxide(s), and 0.203 wt. % $SO_3$.

In a particular embodiment, an alkali-alumino silicate glass composition suitable for the substrates comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $((Al_2O_3+B_2O_3)/\Sigma$ modifiers$)$ >1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $((Al_2O_3+B_2O_3)/\Sigma$modifiers$)$>1.

In still another embodiment, the substrates may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$(SiO_2+B_2O_3+CaO)$≤69 mol. %; $(NaO+K_2O+B_2O_3+MgO+CaO+SrO)$>10 mol. %; 5 mol. %<$(MgO+CaO+SrO)$≤8 mol. %; $(Na_2O+B_2O_3)$<$Al_2O_3$<2 mol. %; 2 mol. %<$Na_2O$<$Al_2O_3$<6 mol. %; and 4 mol. %<$(Na_2O+K_2O)$<$Al_2O_3$≤10 mol. %.

In an alternative embodiment, the substrates may comprise an alkali aluminosilicate glass. In an embodiment, the alkali aluminosilicate glass has a composition comprising: 2 mol. % or more of $Al_2O_3$ and/or $ZrO_2$, or 4 mol % or more of $Al_2O_3$ and/or $ZrO_2$.

In another embodiment, the substrates may comprise a lithium-containing alkali aluminosilicate glass. In an embodiment, the lithium-containing alkali aluminosilicate glass has a composition including, in mol %, $SiO_2$ in an amount in the range from about 60% to about 75%, $Al_2O_3$ in an amount in the range from about 12% to about 20%, $B_2O_3$ in an amount in the range from about 0% to about 5%, $Li_2O$ in an amount in the range from about 2% to about 8%, $Na_2O$ in an amount greater than about 4%, MgO in an amount in the range from about 0% to about 5%, ZnO in an amount in the range from about 0% to about 3%, CaO in an amount in the range from about 0% to about 5%, and $P_2O_5$ in a non-zero amount; wherein the glass substrate is ion-exchangeable and is amorphous, wherein the total amount of $Al_2O_3$ and $Na_2O$ in the composition is greater than about 15 mol %.

Chemical strengthening of glass substrates having base compositions is done by placing the ion-exchangeable glass substrates in a molten bath containing cations ($K^+$, $Na^+$, $Ag^+$, etc) that diffuse into the glass while the smaller alkali ions ($Na^+$, $Li^+$) of the glass diffuse out into the molten bath. The replacement of the smaller cations by larger ones creates compressive stresses near the top surface of glass. Tensile stresses are generated in the interior of the glass to balance the near-surface compressive stresses.

Glass-based substrates may be exposed to a first bath comprising alkali metal ions for a first duration, and subsequently to a second bath comprising alkali metal ions for a second duration. In a detailed embodiment, the glass-based substrate is a lithium-containing aluminosilicate and the bath comprises ions of potassium and sodium.

Higher compressive stresses (CS) are desired for better scratch resistance and drop performance. Higher DOC also improves drop performance, and is therefore preferred as well. However, higher CS and DOC lead to higher CT, which is undesirable for crack propagation and, if too high, can lead to frangibility of the sample.

The glass-based articles produced according to the methods described herein may have maximum CT values in the thin section that are below the frangibility limit.

Articles may have a high-slope (>10 MPa/um) region of the compressive stress profile near the surface extending over a depth of about 2-30 microns, such as about 5-20 um. A peak compressive stress of >450 MPa, and preferably >650 MPa, may be present at the surface. This region may be referred to as the spike. In some embodiments, the ion exchange treatment of the glass-based article that includes the reduced thickness region may serve to form the spike region, such that the spike is present on both the reduced thickness regions and the non-reduced thickness regions.

Frangible behavior may be characterized by at least one of: breaking of the strengthened glass article (e.g., a plate or sheet) into multiple small pieces (e.g., ≤1 mm); the number of fragments formed per unit area of the glass article; multiple crack branching from an initial crack in the glass article; violent ejection of at least one fragment to a specified distance (e.g., about 5 cm, or about 2 inches) from its original location; and combinations of any of the foregoing breaking (size and density), cracking, and ejecting behaviors. As used herein, the terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glass articles described herein, such external restraints are not used in determining the frangibility or frangible behavior of the glass articles.

In some embodiments, a first depth of compression ($DOC_1$) in the first section is located at $0.15 \cdot t_1$ or deeper. The $DOC_1$ may be in the range of $0.15 \cdot t_1$ to $0.23 \cdot t_1$, and all values and subranges therebetween.

In some embodiments, a second depth of compression ($DOC_2$) in the second section with reduced thickness, the $DOC_2$ being located at $0.075 \cdot t_2$ or deeper. The $DOC_2$ may in the range of $0.075 \cdot t_2$ to $0.15 \cdot t_2$, and all values and subranges therebetween.

In some embodiments, the glass-based articles may have a surface compressive stress in the first section ($CS_1$) of 450 MPa or more, and a surface compressive stress in the second section ($CS_2$) of 450 MPa or more. $CS_1$ and $CS_2$ may independently be in the range of 450 MPa to 1.2 GPa, 700 MPa to 950 MPa, or about 800 MPa, and all values and subranges therebetween.

Figure 9A:
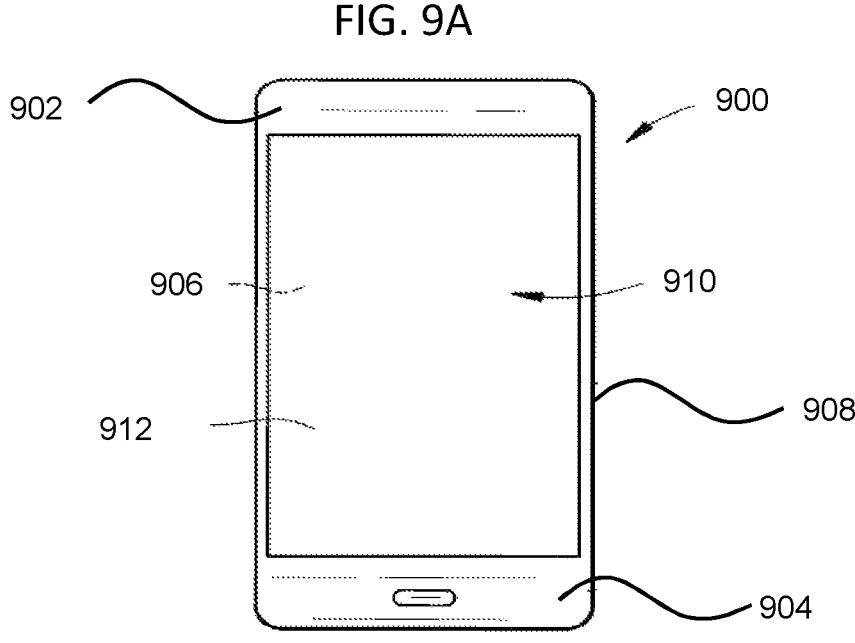
FIG. 9A is a plan view of an exemplary electronic device incorporating any of the glass-based articles disclosed herein.
Figure 9B:
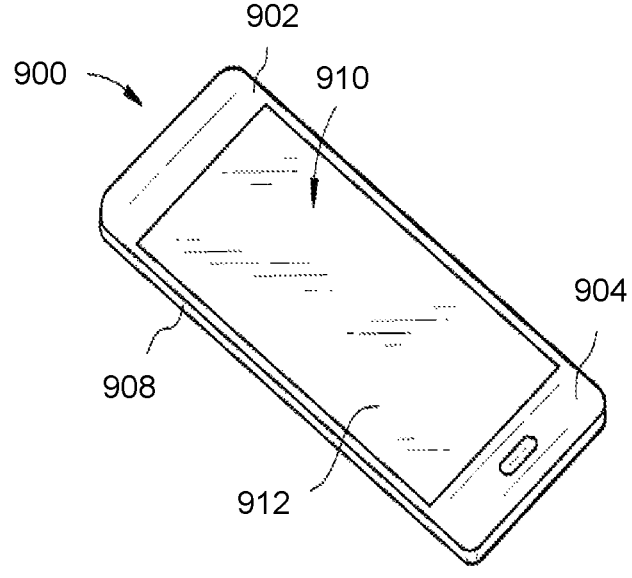
FIG. 9B is a perspective view of the exemplary electronic device of FIG. 9A.

The glass-based articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the glass-based articles disclosed herein is shown in FIGS. 9A and 9B. Specifically, FIGS. 9A and 9B show a consumer electronic device 900 including a housing 902 having front 904, back 906, and side surfaces 908; electrical components (not shown) that are at least partially inside or entirely within the housing and including at least a controller, a memory, and a display 910 at or adjacent to the front surface of the housing; and a cover substrate 912 at or over the front surface of the housing such that it is over the display. In some embodiments, at least a portion of at least one of the cover substrate 912 and the housing 902 may include any of the glass-based articles disclosed herein.

While the foregoing is directed to various embodiments, other and further embodiments of the disclosure may be devised without departing from the basic scope thereof, and the scope thereof is determined by the claims that follow.

What is claimed is:

1. A glass-based article comprising:
   a first region comprising a first thickness, a first compressive stress layer extending from a first surface to a first depth of compression, and a first central tension region comprising a first maximum central tension; and
   a second region comprising a second thickness, a second compressive stress layer extending from a second surface to a second depth of compression, and a second central tension region comprising a second maximum central tension,
   wherein the second thickness is less than the first thickness, and the second depth of compression is less than the first depth of compression, wherein the first depth of compression divided by the first thickness is greater than or equal to 0.15 and the second depth of compression divided by the second thickness is less than or equal to 0.15,
   wherein the second maximum central tension is less than the first maximum central tension, wherein the glass-based article is a component of a cover substrate for a display in a mobile consumer electronic device,
   wherein the first compressive stress layer comprises a first compressive stress, the second compressive stress layer comprises a second compressive stress,
   wherein the first compressive stress and the second compressive stress each have a maximum value greater than 650 MPa, and
   wherein the second thickness comprises a varying metal oxide concentration gradient that extends through the entire second thickness.

2. The glass-based article of claim 1, wherein the first depth of compression divided by the first thickness is about 0.15, and the second depth of compression divided by the second thickness is about 0.15.

3. The glass-based article of claim 1, wherein the first depth of compression divided by the first thickness is substantially equal to the second depth of compression divided by the second thickness.

4. The glass-based article of claim 1, wherein the first compressive layer and the second compressive layer comprise a spike region where a stress profile has a slope greater than 10 MPa/μm.

5. The glass-based article of claim 1, wherein the second thickness is at least 100 microns less than the first thickness.

6. The glass-based article of claim 1, wherein the second thickness divided by the first thickness is in a range from about 0.05 to about 0.96.

7. The glass-based article of claim 1, wherein the second region is off-set from all edges of the glass-based article.

8. The glass-based article of claim 1, wherein the second thickness is greater than or equal to 20% of the first thickness and less than or equal to 30% of the first thickness.

9. A glass-based article comprising:
   a first region comprising a first thickness, a first compressive stress layer extending from a first surface to a first depth of compression, and a first central tension region comprising a first maximum central tension; and
   a second region comprising a second thickness, a second compressive stress layer extending from a second surface to a second depth of compression, and a second central tension region comprising a second maximum central tension,
   wherein the second thickness is less than the first thickness, and the second depth of compression is less than the first depth of compression,
   wherein the second thickness comprises a varying metal oxide concentration gradient that extends through the entire second thickness,
   wherein the second maximum central tension is less than the first maximum central tension, wherein the glass-based article is a component of a cover substrate for a display in a mobile consumer electronic device,
   wherein the first compressive stress layer comprises a first compressive stress, the second compressive stress layer comprises a second compressive stress,
   wherein the first compressive stress and the second compressive stress each have a maximum value greater than 650 MPa, and
   wherein the first depth of compression divided by the first thickness is in a range from about 0.15 to about 0.23, and the second depth of compression divided by the second thickness is in a range from about 0.075 to about 0.15.

10. The glass-based article of claim 9, wherein a concentration of a metal oxide in the second region is about 0.5 mol % or greater.

11. The glass-based article of claim 9, wherein a concentration of a metal oxide is greatest at the first surface or the second surface and decreases substantially constantly to a point between the first surface and the second surface.

12. The glass-based article of claim 11, wherein the concentration of the metal oxide at the point between the first surface and the second surface is non-zero.

13. The glass-based article of claim 9, wherein the total concentration of the metal oxide is in the range from about 1 mol % to about 20 mol %.

\*   \*   \*   \*   \*